United States Patent Office 2,965,910
Patented Dec. 27, 1960

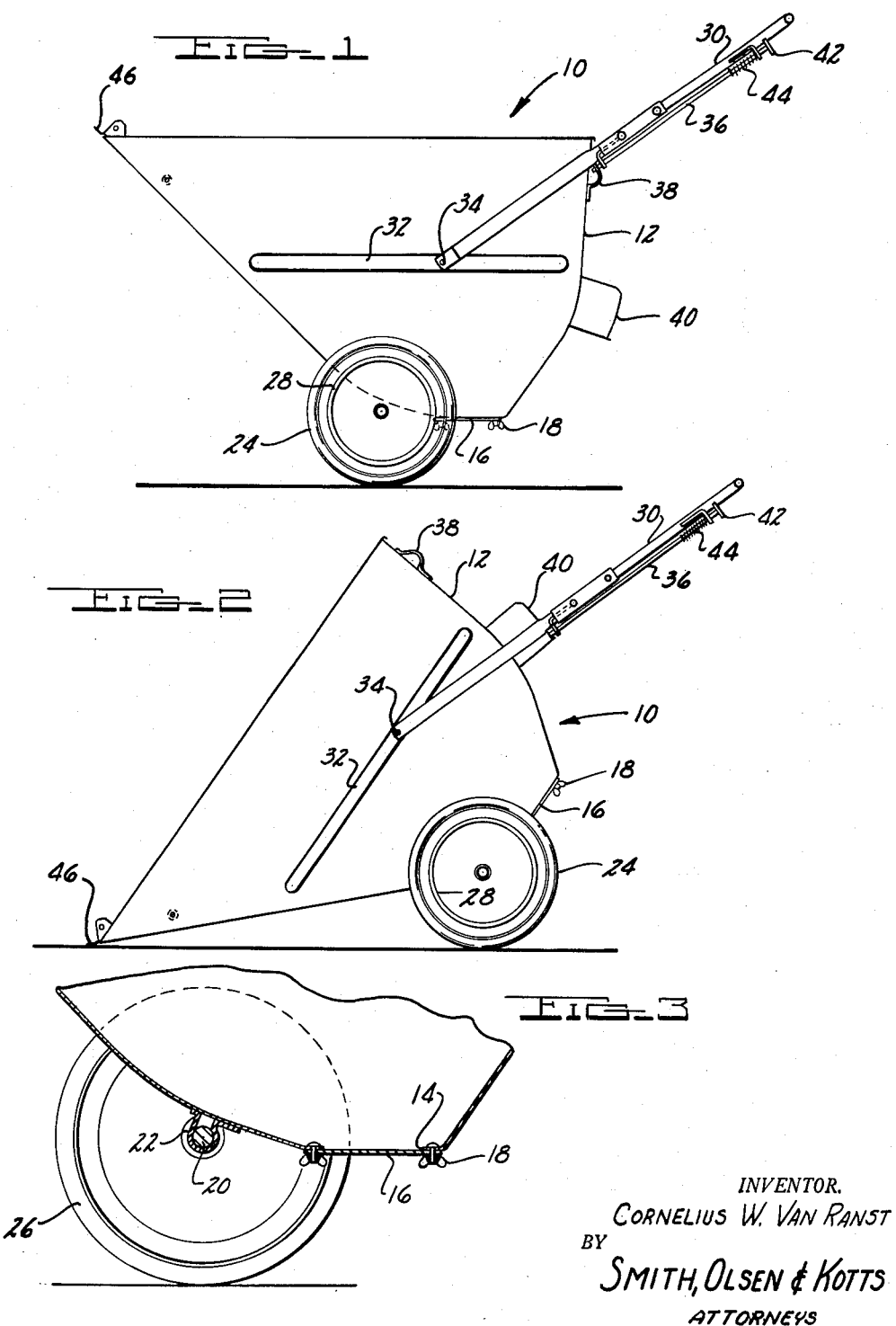

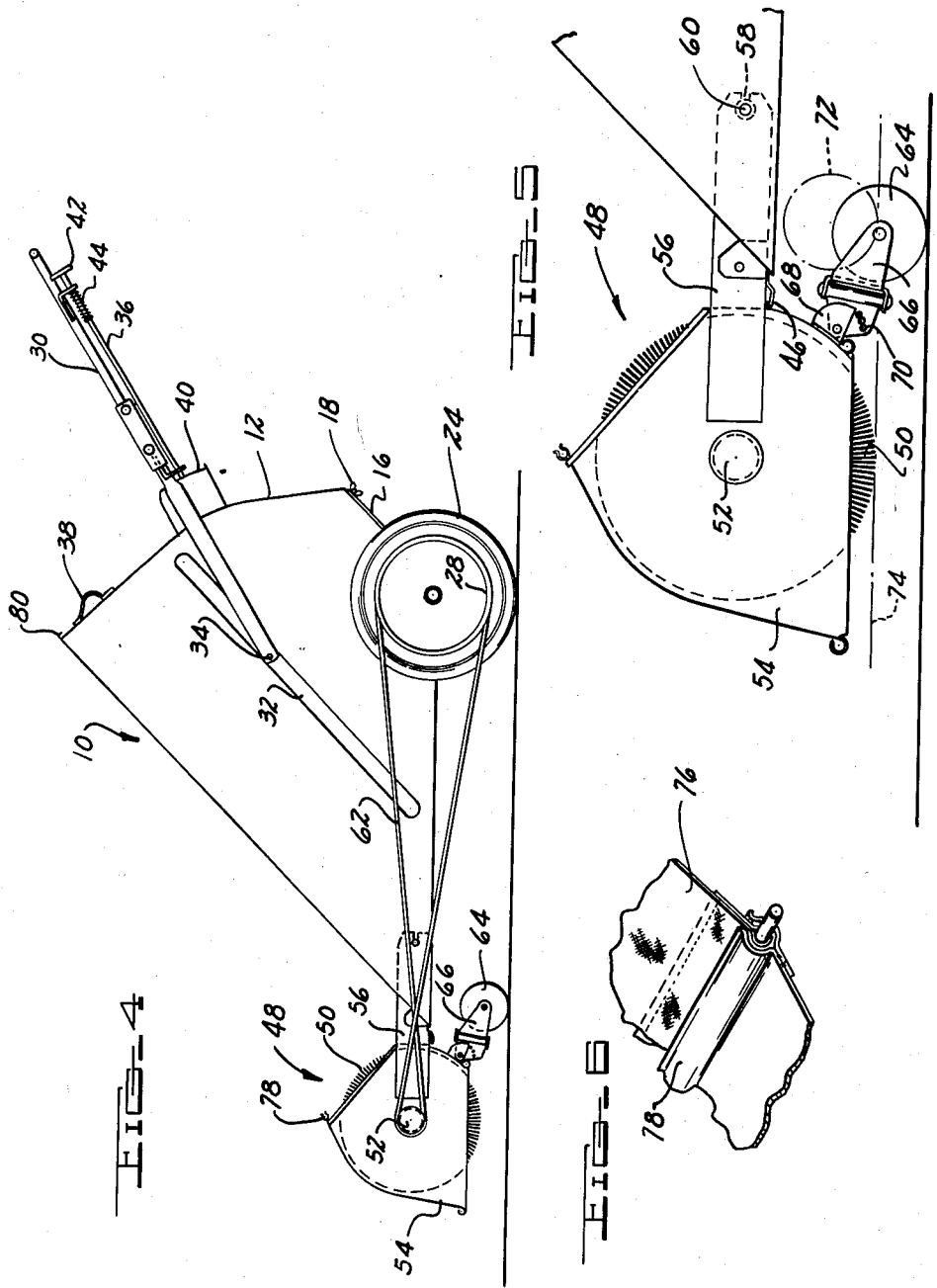

2,965,910

PUSH CART WITH DETACHABLE SWEEPER UNIT

Cornelius W. Van Ranst, 15692 Woodland Drive, Dearborn, Mich.

Filed Jan. 12, 1955, Ser. No. 481,357

6 Claims. (Cl. 15—79)

The present invention relates to a multi-purpose cart assembly, and more particularly to such a cart assembly which can be used as a general utility cart, a lawn sweeper, a snow scraper and various other like purposes.

There has been a trend in recent years toward developing mechanical implements for use in connection with each of the various jobs that must be performed to properly maintain the yard of a home. The cost of obtaining a complete set of such implements is considerable. Furthermore, the storage space required for these implements is sufficiently great so that ownership of all of them frequently is impractical if not impossible for the majority of home owners.

It is an object of the present invention to provide a multi-purpose cart assembly which is constructed and arranged so that it can be used for a wide variety of purposes but which occupies less space than that which would be required by conventional implements designed for these same purposes, said cart assembly being further characterized by its relatively low cost when compared with the corresponding cost of such conventional implements.

It is another object of the present invention to provide a multi-purpose cart assembly of the foregoing character in which a cart is provided which can be converted for various uses by securing special implements thereto, said cart and implements being designed so that each of the latter are optional equipment which can be acquired if and when needed by the purchaser.

It is another object of the present invention to provide a multi-purpose cart assembly of the foregoing character in which the general utility cart has a handle construction which permits the cart to be pushed in an upright position as when transporting refuse or the like, said handle construction also allowing the receptacle of the cart to be tilted forward so that it can be used as a scoop, snow scraper and the like.

It is still another object of the present invention to provide a multi-purpose cart assembly of the foregoing character which enables the general utility cart to be converted into a lawn sweeper by the attachment of a special unit designed for this purpose.

It is still another object of the present invention to provide a special attachment for sweeping lawns or the like, said attachment being constructed and arranged to be secured to a general utility cart by a simple attaching mechanism and when in operation to perform as a very efficient unit.

It is still another object of the present invention to provide a general utility cart which is constructed and arranged so that it can be used with a variety of accessories or attachments whereby the attachments can perform their intended functions when used with the cart and when detached from said cart will require considerably less storage space than conventional implements designed for performing the same function.

Other objects of this invention will appear in the following description and appended claims, reference being had to the accompanying drawings forming a part of this specification wherein like reference characters designate corresponding parts in the several views.

In the drawings:

Fig. 1 is a side elevation of a general utility cart embodying features of the present invention;

Fig. 2 is a side elevation of the general utility cart tilted to one of its operative positions;

Fig. 3 is a fragmentary section showing the construction of the lower portion of the cart;

Fig. 4 is a side elevation of the general utility cart carrying a lawn sweeper attachment;

Fig. 5 is an enlarged side elevation of the lawn sweeper attachment; and

Fig. 6 is a fragmentary view showing a portion of the sweeper attachment and a canopy attached thereto.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Referring now to the drawings, a more detailed description of the invention will be given. The general utility cart 10 includes a receptacle 12 open at the top and having an opening 14 at the bottom which is closed by the cover plate 16, the latter being secured in place by a plurality of screws and wing nuts 18. An axle shaft 20 is secured to the forward underside of the receptacle 12 by a bracket 22. Mounted on the axle in suitable bearings are the two wheels 24 and 26, the former having an annular flange 28 formed in the outer face of the wheel 24 and forming a belt groove for receiving a drive belt.

A handle 30 is pivotally connected to the receptacle 12 for pushing the cart 10. For this purpose, a fore and aft reinforcing rib 32 is provided in the outer surface of each side of the receptacle 12 and the pivot pins 34 are mounted therein. The handle 30 can be locked in any one of several positions by means of the spring actuated rod 36 and the brackets 38 and 40 mounted on the back side of receptacle 12. Bracket 38 has an aperture (not shown) for receiving the end of rod 36 thereby locking the handle 30 in the position shown in Fig. 1. If it is desired to tilt the receptacle 12 to an inclined position as shown in Fig. 2, it is only necessary to pull the hand grip 42 of rod 36 against the action of spring 44 thereby releasing rod 36 from bracket 38. The end of rod 36 can then be inserted into any of a series of apertures (not shown) in the bracket 40, depending on the degree of tilt desired. Thus, when the cart 10 is to be in the position shown in Fig. 2, the rod 36 will be in the lowermost aperture while when it is to be in the position shown in Fig. 4, it will be inserted in a higher aperture.

The general utility cart 10 can be used as a wheel barrow or other similar devices for transporting materials, and the cart will then be used in the position shown in Fig. 1. However, if it is to be used as a scoop or a snow scraper it will be arranged in the position of Fig. 2. For this purpose the receptacle is provided with a forward projecting lip 46 which preferably will be made from a relatively hard steel.

The multi-purpose cart assembly can be used for sweeping leaves, grass and the like by use of the lawn sweeper attachment 48 with the general utility cart 10. The sweeper attachment includes a rotary brush 50 carried on a shaft, on the end of which is mounted the pulley wheel 52. A casing 54 encloses the front and rear of the brush 50 as well as the sides thereof. A pair of arms 56 are permanently fastened to the opposite sides by welding or the like, and project to the rear so as to fit into the open top of the receptacle 12 against the inner opposite sides thereof. The distal ends of the arms 56 have a small slot leading into the ends thereof, as at 58, such slots fitting over studs 60 which are mounted in the side walls of the receptacle 12. Suitable means, such as wing nuts, may then be used to hold the arms 56 securely in place. However, under normal circumstances no locking means is required because the drive belt 62 which is drivingly connected between the groove 28 in the wheel 24 and the pulley wheel 52 will tend to hold the sweeper attachment 48 in place. Furthermore, as the cart 10 is pushed there will be forces tending to push the arms 56 onto the pins 60.

In order to vary the extent of elevation of the brush 50 above the ground, an adjusting mechanism is provided which includes the roller 64 mounted on the bracket 66. The latter is pivotally connected to support arms 68 which are secured to the rear of casing 54. Any suitable detent means 70 is employed to retain the bracket 66 in a selected position. Thus, if desired, the roller can be pivoted to a position as shown in phantom at 72 and the brush 50 will then contact the ground as shown at 74.

In normal operation of the assembly shown in Fig. 4, the wheel 24 will rotate in a clockwise direction when the cart 10 is pushed, resulting in the rotary brush 50 turning in a counterclockwise direction by virtue of the arrangement of the drive belt 62. Leaves, or the like, can then be swept upwardly inside the front of casing 54 and be discharged into the receptacle 12. It will be noted that the lip 46 on the front of the cart 10 serves also to prevent the leaves from being discharged between the brush 50 and the forward edge of cart 10.

An additional option feature of the present invention is the canopy 76, Fig. 6, which can be held at one end by the spring clip 78 on the casing 54, and can be hooked over the opposite upper edge 80 of the receptacle 12, thus assuring that leaves and the like will not be blown by the wind from the cart 10 when the sweeper attachment 48 is being used.

Having thus described my invention, I claim:

1. A multi-purpose cart assembly constructed for use in various selected arrangements on a supporting surface comprising a cart having a sheet metal receptacle open at the top and having a forwardly inclined front wall portion terminating in a forward upper edge, two wheels and an axle mounted on the underside of the receptacle for supporting the receptacle either in a first position with the upper edges of the receptacle in a generally horizontal plane or in a second position with the receptacle pivoted forward so that the forwardly inclined front wall portion is in a generally horizontal plane, at least one of the wheels having a sheet metal disk with a belt groove formed therein and in which a pulley drive belt can be inserted for driving a rotary brush type lawn sweeper unit, means on the receptacle for attaching a rotary brush in a position so that the axis of rotation of the brush will be generally in a plane containing said inclined front wall portion and forward of and in generally parallel spaced relation to said forward upper edge, a rearwardly extending handle having a pivotal connection with said receptacle so that said handle can be retained in approximately the same position relative to the supporting surface when said receptacle is pivoted to either said first or said second positions, and means for locking said handle and said receptacle together in either of said positions to which said receptacle is pivoted.

2. A multi-purpose cart assembly constructed for use in various selected arrangements on a supporting surface comprising a cart having a sheet metal receptacle open at the top and having a forwardly inclined front wall portion terminating in a forward upper edge, two wheels and an axle mounted on the underside of the receptacle for supporting the receptacle either in a first position with the upper edges of the receptacle in a generally horizontal plane or in a second position with the receptacle pivoted forward so that the forwardly inclined front wall portion is in a generally horizontal plane, at least one of said wheels having a belt groove for receiving a drive belt, a rotary brush mounted on the forward upper portion of said receptacle with the axis of rotation of said brush in a plane forming an extension of said inclined front wall portion and in generally parallel relation to said forward upper edge, a drive belt operatively connected between said one wheel and the rotary brush to cause rotation of the latter when the cart is pushed, a rearwardly extending handle having a pivotal connection with said receptacle so that said handle can be set in approximately the same position relative to the supporting surface when said receptacle is pivoted to either said first or said second positions, and means for holding said handle in either of its set positions relative to said receptacle.

3. A multi-purpose cart assembly constructed for use in various selected arrangements on a supporting surface comprising a receptacle open at the top and having a forwardly inclined front wall portion terminating in a forward upper edge, two wheels and an axle mounted on the underside of the receptacle for supporting the receptacle either in a first position with the upper edges of the receptacle in a generally horizontal plane or in a second position with the receptacle pivoted forward so that the forwardly inclined front wall portion is in a generally horizontal plane, a rotary brush mounted on the forward upper portion of said receptacle with the axis of rotation of said brush generally in a plane forming an extension of said inclined front wall portion and in generally parallel relation to said forward upper edge, means operatively connecting the rotary brush with said axle so that when the wheels of the cart are turned the brush will rotate, a rearwardly extending handle having a pivotal connection with said receptacle so that said handle can be set in approximately the same position relative to the supporting surface when said receptacle is pivoted to either said first or said second positions, and means for retaining said handle in either of its set positions relative to said receptacle.

4. A multi-purpose cart assembly constructed for use in various selected arrangements on a supporting surface comprising a receptacle open at the top and having a forwardly inclined front wall portion terminating in a forward upper edge, two wheels rotatably mounted on the underside of the receptacle for supporting the receptacle either in a first position with the upper edges of the receptacle in a generally horizontal plane or in a second position with the receptacle pivoted forward so that the forwardly inclined front wall portion is more nearly in a horizontal plane than when in the first position, a rotary brush mounted on the forward upper portion of said receptacle with said brush generally in a plane forming an extension of said inclined front wall portion and in generally parallel relation to said forward upper edge, a means for selectively varying the distance the brush is above the suporting surface when the receptacle is in said second position, means operatively connecting the rotary brush with said wheels so that when the wheels are turned the brush will rotate, a rearwardly extending handle having a pivotal connection with said receptacle so that said handle can be set in approximately the same position relative to the supporting surface when said receptacle is pivoted to either said first or said second positions, and means for retaining said handle relative to said receptacle in either the first or the second of said positions.

5. A multi-purpose cart assembly constructed for use in various selected arrangements on a supporting surface comprising a receptacle open at the top and having a forwardly inclined front wall portion terminating in a forward upper edge, two wheels rotatably mounted on the underside of the receptacle for supporting the receptacle either in a first position with the upper edges of the receptacle in a generally horizontal plane or in a second position with the receptacle pivoted forward so that the forwardly inclined front wall portion is more nearly in a horizontal plane than when in the first position, a rotary brush mounted on the forward upper portion of said receptacle with said brush generally in a plane forming an extension of said inclined front wall portion and in generally parallel relation to said forward upper edge, said rotary brush being supported on and removably attached to said receptacle by a pair of arms extending into said receptacle and supported by said front wall portion, the inner ends of said arms being held in place by pins mounted in the side walls of the receptacle, means operatively connecting the rotary brush with said wheels so that when the wheels are turned the brush will rotate, a rearwardly extending handle having a pivotal connection with said receptacle so that said handle can be set in approximately the same position relative to the supporting surface when said receptacle is pivoted to either said first or said second positions, and means for retaining said handle relative to said receptacle in either the first or the second of said positions.

6. A multi-purpose cart assembly constructed for use in various selected arrangements on a supporting surface comprising a receptacle open at the top and having a forwardly inclined front wall portion terminating in a forward upper edge, two wheels rotatably mounted on the underside of the receptacle for supporting the receptacle either in a first position with the upper edges of the receptacle in a generally horizontal plane or in a second position with the receptacle pivoted forward so that the forwardly inclined front wall portion is more nearly in a horizontal plane than when in the first position, a rotary brush mounted on the forward upper portion of said receptacle with said brush generally in a plane forming an extension of said inclined front wall portion and in generally parallel relation to said forward upper edge, a casing enclosing the forward side of said rotary brush, a canopy attached to the upper edge of said casing and the rear upper edge of said receptacle, means operatively connecting the rotary brush with said wheels so that when the wheels are turned the brush will rotate, a rearwardly extending handle having a pivotal connection with said receptacle so that said handle can be set in approximately the same position relative to the supporting surface when said receptacle is pivoted to either said first or said second positions, and means for retaining said handle relative to said receptacle in either the first or the second of said positions.

References Cited in the file of this patent

UNITED STATES PATENTS

| | | |
|---|---|---|
| 283,415 | Passmore | Aug. 21, 1883 |
| 463,236 | Schaeffer | Nov. 17, 1891 |
| 998,517 | Humm | July 18, 1911 |
| 1,015,969 | McCrary | Jan. 30, 1912 |
| 1,235,536 | Bradshaw | July 31, 1917 |
| 1,298,126 | Vessey | Mar. 25, 1919 |
| 1,615,928 | Breeden | Feb. 1, 1927 |
| 1,955,997 | Yant | Apr. 24, 1934 |
| 2,092,230 | Thomas | Sept. 7, 1937 |
| 2,233,140 | McDermott | Feb. 25, 1941 |
| 2,275,356 | Funk | Mar. 3, 1942 |
| 2,323,995 | Hiroshima | July 13, 1943 |
| 2,604,234 | Long | July 22, 1952 |
| 2,697,846 | Wilcox et al. | Dec. 28, 1954 |
| 2,723,053 | Gandrud | Nov. 8, 1955 |
| 2,727,264 | Dunham | Dec. 20, 1955 |
| 2,727,265 | Dunham | Dec. 20, 1955 |
| 2,732,572 | Dunham | Jan. 31, 1956 |

FOREIGN PATENTS

| | | |
|---|---|---|
| 259,463 | Germany | May 5, 1913 |
| 333,739 | Germany | Mar. 4, 1921 |